US009879700B1

(12) United States Patent
Jackowski et al.

(10) Patent No.: US 9,879,700 B1
(45) Date of Patent: Jan. 30, 2018

(54) ROBOTIC HYDRAULIC SYSTEM (71) Applicant: Google Inc., Mountain View, CA (US)

(72) Inventors: Zachary John Jackowski, Mountain View, CA (US); Stephen Berard, Mountain View, CA (US); Alex Khripin, Mountain View, CA (US); Alfred Anthony Rizzi, Mountain View, CA (US)

(73) Assignee: Boston Dynamics, Inc.

( * ) Notice: Subject to any disclaimer, the term of this patent is extended or adjusted under 35 U.S.C. 154(b) by 538 days.

(21) Appl. No.: 14/510,416

(22) Filed: Oct. 9, 2014

Related U.S. Application Data

(60) Provisional application No. 62/027,496, filed on Jul. 22, 2014.

(51) Int. Cl.
*F15B 1/04* (2006.01)
*F15B 21/00* (2006.01)
*F15B 1/033* (2006.01)

(52) U.S. Cl.
CPC ............. *F15B 1/04* (2013.01); *F15B 1/033* (2013.01); *F15B 21/001* (2013.01);
(Continued)

(58) Field of Classification Search
CPC .. F15B 1/033; F15B 1/027; F15B 1/02; F15B 1/0275; F15B 2201/51; F15B 2201/515; F15B 2211/625; F16H 61/4096
See application file for complete search history.

(56) References Cited

U.S. PATENT DOCUMENTS 3,496,879 A * 2/1970 Brandes ................. F04B 41/02
417/299
3,815,622 A 6/1974 Allen
(Continued)

FOREIGN PATENT DOCUMENTS

EP 0035282 B1 7/1987

OTHER PUBLICATIONS

Bauchspiess et al., "Predictive sensor guided robotic manipulators in automated welding cells,", Journal of Materials Processing Technology, 109, pp. 13-19, (2001).
(Continued)

*Primary Examiner* — Logan Kraft
*Assistant Examiner* — Michael Quant
(74) *Attorney, Agent, or Firm* — Honigman Miller Schwartz and Cohn LLP (57) ABSTRACT

A control system may receive sensor data indicative of respective fluid levels of two or more hydraulic accumulators configured to operate at respective target fluid levels within a hydraulic system. The control system may determine respective errors of the hydraulic accumulators based on the respective fluid levels and respective target fluid levels of the hydraulic accumulators. The respective errors may correspond to pressure errors, fluid volume errors, or other types of errors of the hydraulic accumulators. Responsive to determining the respective errors, the control system may determine that the error of a given hydraulic accumulator is greater than errors of the other hydraulic accumulators and provide instructions to control a hydraulic valve to supply fluid from a single pump of the hydraulic system to the given hydraulic accumulator.

9 Claims, 6 Drawing Sheets

(52) U.S. Cl.
CPC ..... *F15B 2201/51* (2013.01); *F15B 2201/515* (2013.01); *Y10S 901/22* (2013.01)

(56) References Cited

U.S. PATENT DOCUMENTS

| | | | |
|---|---|---|---|
| 4,246,978 A * | 1/1981 | Schulz | B60K 3/00 |
| | | | 180/165 |
| 4,647,004 A | 3/1987 | Bihlmaier | |
| 5,218,895 A | 6/1993 | Lukick et al. | |
| 5,289,680 A | 3/1994 | Obe et al. | |
| 5,615,553 A | 4/1997 | Lourigan | |
| 5,690,396 A | 11/1997 | Johnston | |
| 5,829,335 A | 11/1998 | Ewald et al. | |
| 6,035,828 A | 3/2000 | Anderson et al. | |
| 6,067,946 A | 5/2000 | Bunker et al. | |
| 6,113,642 A | 9/2000 | Petrofsky et al. | |
| 6,273,067 B1 | 8/2001 | Bazinet | |
| 6,305,163 B1 | 10/2001 | Paakkunainen | |
| 6,463,949 B2 | 10/2002 | Ferguson | |
| 6,938,535 B2 | 9/2005 | Price | |
| 7,043,906 B2 * | 5/2006 | Suzuki | E02F 9/2217 |
| | | | 60/422 |
| 7,107,766 B2 | 9/2006 | Zacche | |
| 7,401,465 B2 | 7/2008 | Emmert et al. | |
| 7,487,856 B2 * | 2/2009 | Edson | B62D 5/063 |
| | | | 180/411 |
| 7,600,715 B2 | 10/2009 | Matsui | |
| 7,729,796 B2 | 6/2010 | Hartrampf et al. | |
| 7,831,352 B2 | 11/2010 | Laumer et al. | |
| 8,102,134 B1 | 1/2012 | Theobald | |
| 8,434,302 B2 * | 5/2013 | Wu | F15B 1/021 |
| | | | 60/459 |
| 8,469,424 B2 | 6/2013 | Takenaka et al. | |
| 8,585,776 B2 | 11/2013 | Lind et al. | |
| 8,726,646 B2 | 5/2014 | Riedel et al. | |
| 2010/0090638 A1 | 4/2010 | Saunders et al. | |
| 2012/0000561 A1 | 1/2012 | Schuttermair et al. | |
| 2012/0233997 A1 | 9/2012 | Andruch, III et al. | |
| 2012/0291873 A1 | 11/2012 | Potter et al. | |
| 2016/0037722 A1 * | 2/2016 | Missotten | B60K 6/12 |
| | | | 701/48 |

OTHER PUBLICATIONS

Hu et al., "Generalized predictive control of an industrial mobile robot," Proceeds of the IASTED International Conference, (1999).
azorobotics.com, "Pneumatic and Hydraulic Actuators", 2014.
Ponomareva, "Hydraulic and Pneumatic Actuators and their Application," Mechatronics, (2006).
Sepehri et al., "Experimental evaluation of generalized predictive control applied to a hydraulic actuator," Cambridge Journals Online, 16, pp. 463-474, (1998).
Andruch, et al. Design, Simulation and Control of Hydraulic System Topographies with Integrated Energy Recovery, National Fluid Power Association, 2011.
Shen, et al., Energy-Saving Analysis of Hydraulic Hybrid Excavator Based on Common Pressure Rail, The Scientific World Journal, 2013.

* cited by examiner

ROBOTIC HYDRAULIC SYSTEM

CROSS REFERENCE TO RELATED APPLICATION

The present application claims priority to U.S. Provisional patent application Ser. No. 62/027,496 filed on Jul. 22, 2014 and entitled "Robotic Hydraulic System," the entire contents of which are herein incorporated by reference.

BACKGROUND

Robotic systems may be used for applications involving material handling, welding, assembly, and dispensing, among others. Over time, the manner in which these robotic systems operate is becoming more intelligent, more efficient, and more intuitive. As robotic systems become increasingly prevalent in numerous aspects of modern life, the desire for efficient robotic systems becomes apparent. Therefore, a demand for efficient robotic systems has helped open up a field of innovation in actuators, sensing techniques, as well as component design, assembly, and powering of the robotic systems.

SUMMARY

In one aspect, a hydraulic system is provided. The hydraulic system may include a plurality of hydraulic accumulators configured to operate at respective target fluid levels and a sensor subsystem configured to sense respective fluid levels of the hydraulic accumulators. The hydraulic system may also include a fluid supply system having a single pump coupled to a hydraulic valve for supplying fluid to the hydraulic accumulators. Additionally, the hydraulic system may also include a controller configured to calculate respective errors of the hydraulic accumulators based on the respective fluid levels and the respective target fluid levels of the hydraulic accumulators. The respective errors of the hydraulic accumulators may correspond to pressure errors, fluid volume errors, etc. The controller may also determine a particular hydraulic accumulator that has an error greater than the errors of the other hydraulic accumulators, and electronically control the fluid supply system, with the hydraulic valve, to supply fluid to the particular hydraulic accumulator.

In another aspect, a computing device may receive sensor data indicative of respective fluid levels of a first hydraulic accumulator and a second hydraulic accumulator. The first hydraulic accumulator may be configured to operate at a first target fluid level and the second hydraulic accumulator may be configured to operate at a second target fluid level. A first error of the first hydraulic accumulator may be determined based on a fluid level of the first hydraulic accumulator and the first target fluid level, and a second error of the second hydraulic accumulator may be determined based on a fluid level of the second hydraulic accumulator and the second target fluid level. The first error may be greater than the second error. In addition, instructions may be provided to control a hydraulic valve of a fluid supply system to supply fluid to the first hydraulic accumulator. The fluid supply system may include a single pump configured to supply the fluid to the first hydraulic accumulator.

In yet another aspect, a non-transitory computer readable medium is provided. The non-transitory computer readable medium may have stored thereon executable instructions that, upon execution by a computing device, cause the computing device to perform operations. The operations may comprise receiving, at a computing device, sensor data indicative of respective fluid levels of a first hydraulic accumulator and a second hydraulic accumulator. The first hydraulic accumulator may be configured to operate at a first target fluid level and the second hydraulic accumulator may be configured to operate at a second target fluid level. The operations may include determining a first error of the first hydraulic accumulator based on a fluid level of the first hydraulic accumulator and the first target fluid level, and a second error of the second hydraulic accumulator based on a fluid level of the second hydraulic accumulator and the second target fluid level. The operations may also include determining that the first error is greater than the second error. In addition, the operations may include providing instructions to control a hydraulic valve of a fluid supply system to supply fluid to the first hydraulic accumulator. The fluid supply system may include a single pump configured to supply the fluid to the first hydraulic accumulator.

These as well as other aspects, advantages, and alternatives, will become apparent to those of ordinary skill in the art by reading the following detailed description, with reference where appropriate to the accompanying figures.

DETAILED DESCRIPTION

The following detailed description describes various features and functions of the disclosed systems and methods with reference to the accompanying figures. The illustrative system and method implementations described herein are not meant to be limiting. Certain aspects of the disclosed systems and methods can be arranged and combined in a wide variety of different configurations, all of which are contemplated herein.

A robotic device or another type of mechanical device may operate using different drive systems for powering movement and operations of components. Among the different possible types of drive systems, a robotic device may include an electric drive system, a hydraulic system, and/or a pneumatic drive system for supplying power to the components of the robotic device, such as actuators, legs, arms, wheels, robotic joints, and/or other components. Although a robotic device often includes an electric drive system for providing power or speed for the robotic device through the use direct current (DC) servo motors and/or other type of electric motors to smaller components and/or computing systems of the robotic device, larger mechanical components may require high amounts of power and/or force that the electric drive system may not be configured to provide.

To make up for possible deficiencies associated with an electric drive system, a robotic device may configured with a hydraulic system that supplies power to mechanical features of the robotic device through the use of pressurized fluid power. The hydraulic system may generate the fluid power by transmitting energy via the use of a fluid, such as oil or water that is under pressure generated by a pump or pumps within the hydraulic system. Among possible designs, the hydraulic system may involve a system of pipes and/or tubes for carrying the pressurized fluid throughout the system to the different components. These components may include hydraulic accumulators designed to operate as energy storage, and for supplying the hydraulic power to operate mechanical components, such as legs or arms of the robotic device. Within example implementations, different types of hydraulic systems may operate within a robotic device, each which may be constructed based on a design configured to meet the power needs of certain components of the robotic device. As such, a factor to consider when designing a hydraulic system for a robotic device may be the weight of the system as well as the power levels enabled by the hydraulic system.

As described herein, pressure levels and fluid levels may refer to various types of levels associated with components within a hydraulic system, such as hydraulic accumulators. A control system may use pressure levels, fluid levels, and/or other information to calculate pressure errors, fluid errors, and/or obtain other information corresponding to the operations of the hydraulic system.

In some example implementations, a hydraulic system may be configured with a single pump and single motor for supplying pressurized fluid to various hydraulic components to limit the overall weight of the hydraulic system. By using the single pump and motor, the operation of robotic device may benefit from having the lighter hydraulic system, which may enable the robotic device to travel at higher speeds or be manufactured in a more cost efficient fashion, for example.

In order to supply power to components of the robotic device, the hydraulic system may include multiple hydraulic accumulators acting as energy storage reservoirs and configured to operate at target fluid levels. The target fluid levels may correspond to target pressure levels, volume levels, or other types of levels. These hydraulic accumulators may be pressurized by receiving fluid pressure from the single pump powered by the single motor. A target pressure level of a hydraulic accumulator may represent a range of fluid and/or pressure levels at which the hydraulic accumulator efficiently operates. At these pressure levels, the hydraulic accumulator may provide power received from the pressurized fluid to components of the robotic device.

These hydraulic accumulators may have different target fluid and/or pressure levels. The target pressure levels may be based on the requirements of the components of the robotic device receiving power from the respective hydraulic accumulators. For example, a hydraulic system may include one low pressure accumulator, one lower-middle pressure accumulator, one upper-middle pressure accumulator, and one high pressure accumulator. Additionally, the hydraulic accumulators may have adjustable target pressure levels in some examples. The target pressure levels may be adjusted adaptively while the robotic device performs an operation.

In some examples, the hydraulic accumulators may be hydraulic pressure rail accumulators configured supply fluid pressure to operate mechanical actuators of a robotic device, for example. A pressure rail hydraulic accumulator may be configured to operate within a particular pressure range. Further, the target pressure levels of the hydraulic accumulators may be adjustable.

In order to supply the different hydraulic accumulators, the hydraulic system may include a hydraulic valve configured to switch the flow of the pressured fluid from the single pump of the system. The hydraulic valve may be controlled by a control system of the robotic device, which may be part of the hydraulic system, or a general computing system of the robotic device, for example. The hydraulic valve may be controlled by a controller. A multi-port selector valve may be used in some examples.

Additionally, an example hydraulic system may also include a sensor subsystem for sensing fluid and/or pressure levels (e.g., magnitude of pressures) of the hydraulic accumulators at any given time. Monitoring the various levels of the hydraulic accumulators may enable the control system and/or a computing system associated with the hydraulic system to calculate errors for each of the hydraulic accumulators at a given time as well as manage the overall operation of the hydraulic system. The errors for the hydraulic accumulators may correspond to pressure errors, fluid volume errors, or other types of errors.

In some examples, the control system may calculate the pressure error of a hydraulic accumulator by determining the difference between the current pressure level of the hydraulic accumulator compared to the target pressure level at which the hydraulic accumulator is configured to operate. As such, the pressure error may represent the amount of pressure that an accumulator deviates from the target pressure level or pressure range of the hydraulic accumulator.

In other examples, the control system may determine the fluid volume errors based on the volumes of the respective hydraulic accumulators compared to the target pressure levels or target volumes for the hydraulic accumulators. The control system may measure the fluid volume errors using other operations as well. Additionally, the control system may determine other types of errors, which may involve using the pressure levels and target pressure levels of the hydraulic accumulators. Calculating the fluid volume error for one or more accumulators may represent a direct method for determining control action. In particular, the system may operate by pumping volumes of fluid so that changes in pressure occur when fluid is pumped into a particular accumulator.

During operation, the control system may be configured to cause the fluid supply system to switch fluid to particular hydraulic accumulators based on detected changes in the error values (e.g., pressure errors, fluid volume errors) of each accumulator. As an example illustration, the controller may control the hydraulic valve so that the fluid supply system (e.g., pump and hydraulic valve) supplies fluid to a particular hydraulic accumulator with the greatest error. This configuration may be maintained until the control system determines that another accumulator has a greater error. The controller may switch the hydraulic valve between hydraulic accumulators at predefined intervals, such as at 50-100 millisecond intervals. In other configurations, the control system may change the fluid path away from the supplied hydraulic accumulator after charging this hydraulic accumulator for a predefined amount of time (e.g., 20 milliseconds). Similarly, the controller may control the hydraulic valve so that the fluid supply system supplies fluid to a particular hydraulic accumulator with the greatest fluid volume error, for example.

In another example, the control system may be configured to switch the flow of the fluid power between the hydraulic accumulators in a predefined order or cycle. Further, in other examples, the control system may control its motor speed to operate proportionally to the state of hydraulic fluid valve.

Figure 1:
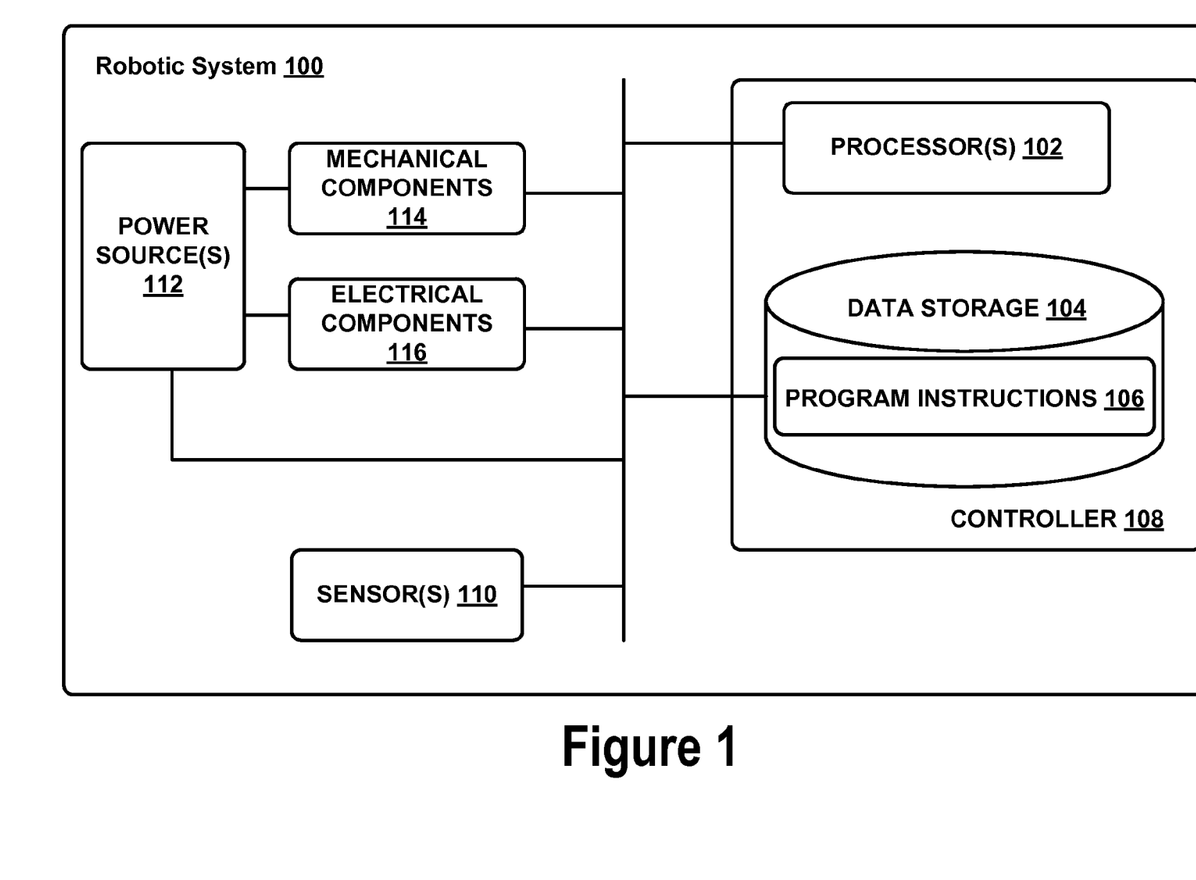
FIG. 1 illustrates a configuration of a robotic system, according to an example implementation.

Referring now to the figures, FIG. 1 illustrates an example configuration of a robotic system. The robotic system 100 represents an example robotic system configured to perform the operations described herein. Additionally, the robotic system 100 may be configured to operate autonomously, semi-autonomously, and/or by providing control to user(s) through various interfaces. Also, the robotic system 100 may exist in various forms, such as a humanoid robot or a quadruped robot, among other examples. Furthermore, the robotic system 100 may also be referred to as a robotic device, mobile robot, or robot, etc.

As shown in FIG. 1, the robotic system 100 includes processor(s) 102, data storage 104, program instructions 106, controller 108, sensor(s) 110, power source(s) 112, mechanical components 114, and electrical components 116. The robotic system 100 is shown for illustration purposes, as robotic system 100 and may include more or less components than shown in FIG. 1. The various components of robotic system 100 may be connected in any manner, including wired or wireless connections, etc. Further, in some examples, components of the robotic system 100 may be positioned on multiple entities rather on a single entity. Other example illustrations of robotic system 100 may exist as well.

Processor(s) 102 may operate as general-purpose processor(s) or a special purpose processor(s) (e.g., digital signal processors, application specific integrated circuits, etc.). The processor(s) 102 can be configured to execute computer-readable program instructions 106 that are stored in the data storage 104.

The data storage 104 may exist as any one or more various types of storage configured to hold memory. For example, the data storage 104 may include or take the form of one or more non-transitory computer-readable storage media that can be read or accessed by processor(s) 102. The one or more computer-readable storage media can include volatile and/or non-volatile storage components, such as optical, magnetic, organic or other memory or disc storage, which can be integrated in whole or in part with processor(s) 102. In some implementations, the data storage 104 may be a single physical device (e.g., one optical, magnetic, organic or other memory or disc storage unit), while in other implementations, the data storage 104 can be implemented using two or more physical devices, which may communicate via wired or wireless communication. Further, in addition to the non-transitory computer-readable program instructions 106, the data storage 104 may include additional data such as diagnostic data, among other possibilities.

The controller 108 may include the processor(s) 102, the data storage 104, and the non-transitory computer-readable program instructions. The robotic system 100 may include multiple controllers, which may perform different operations. The controller 108 may serve as a link between portions of the robotic system 100, such as a link between mechanical components 114 and/or electrical components 116. Further, the controller 108 may control mechanical components 114 and/or electrical components 116. Other examples of controllers may exist as well. For example, the controller 108 may include circuitry.

Additionally, the robotic system 100 includes one or more sensor(s) 110 such as force sensors, proximity sensors, motion sensors, load sensors, position sensors, touch sensors, depth sensors, ultrasonic range sensors, and/or infrared sensors, among other possibilities. The sensor(s) 110 may provide sensor data to the processor(s) 102 to allow for appropriate interaction of the robotic system 100 with the environment, as well as monitoring the robotic system 100. The sensor data may be used in evaluation of various factors for activation and deactivation of mechanical components 114 and electrical components 116.

For instance, the sensor(s) 110 may provide information indicative of the environment of the robotic device for the controller 108 and/or computing system to use to determine operations for the robotic system 100. The sensor(s) 110 may capture data corresponding to the terrain of the environment or location of nearby objects, which may assist with environment recognition and navigation, etc. In one example configuration, the robotic system 100 may include a sensor system that includes RADAR, LIDAR, a global positioning system (GPS), and/or other sensors for capturing information regarding the environment of the robotic system 100. The sensor(s) 110 may monitor the environment in real-time and detect obstacles, elements of the terrain, weather conditions, temperature, and/or other parameters of the environment for the robotic system 100.

Further, the robotic system 100 may include other sensor(s) 110 configured to receive information indicative of the state of various components of the robotic system 100. The sensor(s) 110 may measure activity of systems of the robotic system 100 and receive information based on the operation of the various features of the robotic system 100, such the operation of extendable legs, arms, or other mechanical and/or electrical features of the robotic system 100. The sensor data provided by the sensors may enable the controller 108 to determine errors in operation as well as monitor overall functioning of components of the robotic system 100. For example, the controller 108 may use sensor data to determine a stability of the robotic system 100 during operations, e.g., walking, running, etc., as well as measurements related to power levels, communication activities, and components that may require repair or resetting, among other information.

As one example configuration, the robotic system 100 may include gyroscope(s), accelerometer(s), and/or other possible sensors to provide sensor data. As such, the gyroscope(s) may measure an orientation of the robotic system 100 and the accelerometer(s) may measure proper acceleration of the robotic system 100. Further, sensor(s) 110 may also monitor the current state of a function, such as a gait of the robotic system 100.

Additionally, the robotic system 100 may also include one or more power source(s) 112 configured to supply power to various components of the robotic system 100. Among possible power systems, the robotic system 100 may include a hydraulic system, pneumatic system, electrical system, batteries, a gasoline engine, and/or other types of power systems. As an example, the robotic system 100 may include one or more batteries configured to provide charge to components via a wired and/or wireless connection. Components of the mechanical components 114 and electrical components 116 may each connect to a different power source or may be powered by the same power source. Components of the robotic system 100 may connect to multiple power source(s) 112 as well.

Further, the power source(s) 112 may charge using various types of charging technology, such as wired connections to an outside power source, wireless charging, combustion, or other examples.

Additionally, the robotic system 100 may include a hydraulic system configured to provide power to the mechanical components 114 using pressurized, fluid power. Components of the robotic system 100 may operate based on hydraulic fluid being transmitted throughout the hydraulic system to various hydraulic accumulators and hydraulic cylinders, for example. The hydraulic system of the robotic system 100 may transfer a large amount of power through small tubes, flexible hoses, and/or other links configured using various materials, such as metals or rubber, between components of the robotic system 100. Other power sources, such as a pneumatic system, may be included within the robotic system 100.

Mechanical components 114 represent hardware of the robotic system 100 that may enable the robotic system 100 to operate and perform physical functions. As a few examples, the robotic system 100 may include actuator(s), extendable leg(s) ("legs"), arm(s), wheel(s), one or multiple structured bodies for housing the computing system or other components, and other mechanical components. The mechanical components 114 may depend on the design of the robotic system 100 and may also be based on the functions and/or tasks the robotic system 100 may be configured to perform. In some examples, the robotic system 100 may be configured to add and/or remove mechanical components 114, which may involve assistance from a user and/or other robotic device. For example, the robotic system 100 may be initially configured with four legs, but may altered by a user or the robotic system 100 to remove two of the four legs to operate as a biped.

The electrical components 116 may include various components capable of processing, transferring, providing electrical charge or electric signals, for example. Among possible examples, the electrical components 116 may include electrical wires, circuitry, and/or wireless communication transmitters and receivers to enable operations of the robotic system 100. The electrical components 116 may interwork with the mechanical components 114 to enable the robotic system 100 to perform various functions. The electrical components 116 may be configured to provide power from the power source(s) 112 to the various mechanical components 114, for example. Further, the computing system 100 may include electric motors. Other examples of electrical components 116 may exist as well.

Figure 2:
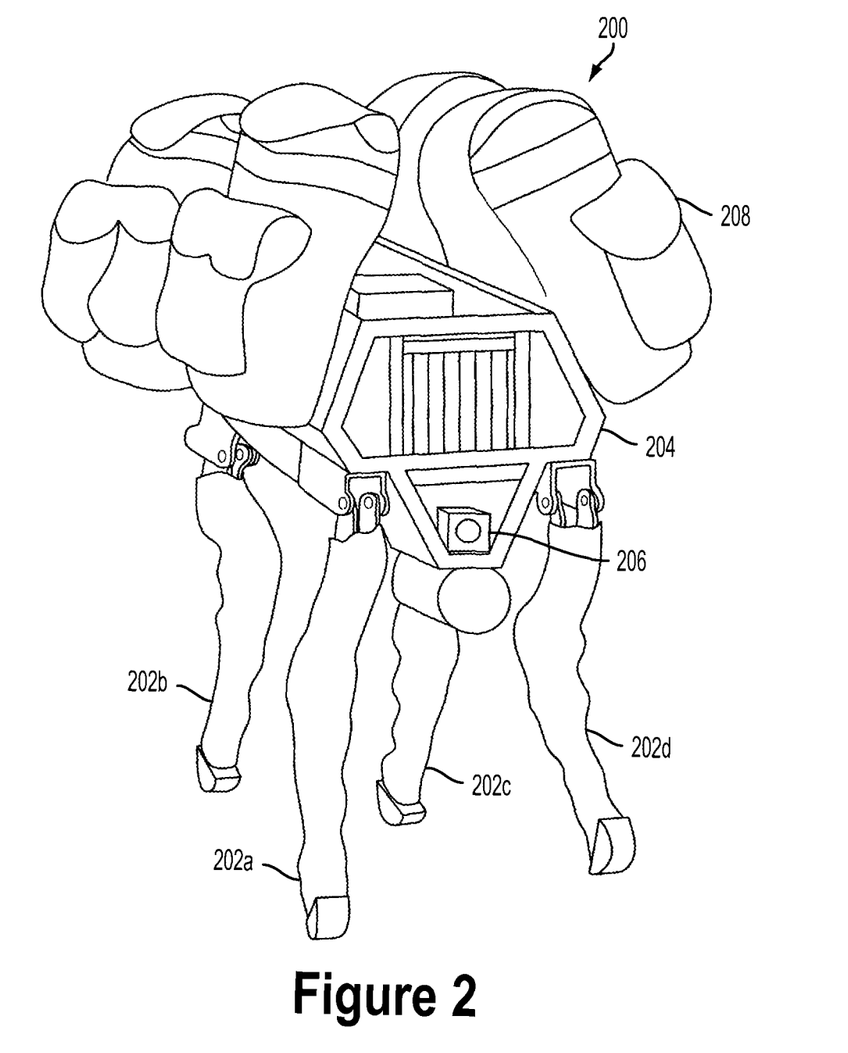
FIG. 2 illustrates a quadruped robot, according to an example implementation.

FIG. 2 illustrates a quadruped robot, according to an example implementation. Robotic device 200 may be a physical representation of the robotic system 100 shown in FIG. 1 or may be based on other configurations. Among other possible functions, the robotic device 200 may be configured to perform the operations described herein. Robotic device 200 includes leg 202a, leg 202b, leg 202c, and leg 202d connected to a body 204. Robotic device 200 may also include sensors (e.g., sensor 206) configured to provide sensor data to a computing system of the robotic device 200. Further, the robotic device 200 is illustrated carrying objects 208 on the body 204. Within other example implementations, the robotic device 200 may include more or less components and may include components not shown in FIG. 2.

Although the robotic device 200 includes four legs 202a-202d in the illustration shown in FIG. 2, the robotic device 200 may include more or less legs. Further, the configuration, position, and/or structure of the legs 202a-202d may vary in example implementations. The legs 202a-202d enable the robotic device 200 to move, and may be configured to operate in multiple degrees of freedom. In particular, the legs 202a-202d may enable the robotic device 200 to travel at various speeds through mechanically controlling of the legs 202a-202d according to the various gaits.

A gait is a pattern of movement of the limbs of animal, robotic device, or mechanical structure. As such, the robotic device 200 may navigate by operating the legs 202a-202d to perform various gaits. Examples gaits include a walk, a trot, a gallop, a bound, a run, etc. The robotic device 200 may use a variety gaits to travel within an environment, which may involve selecting a gait based on speed, terrain, the need to maneuver, and/or energy efficiency. The robotic device 200 may be configured to switch between gaits.

Additionally, the robotic device 200 may include other mechanical appendages, which may be attached to the robotic device 200 at various positions. The robotic device 200 may include mechanical arms, grippers, wheels, or other features. The legs 202a-202d may have feet or other type of mechanical features that enables control and/or stability upon various types of surfaces that the robotic device may encounter.

The legs 202a-202d of the robotic device 200 may operate using power provided by hydraulic accumulators within a hydraulic system of the robotic device 200. As such, the legs 202a-202d may operate based on pressurized, fluid power supplied by the hydraulic system. The hydraulic accumulators of the hydraulic system may store energy in the form of fluid and may suddenly or intermittently release the energy as needed by the legs 202a-202d. For some operations, the hydraulic accumulators may store a large of amount of energy and refill when the legs 202a-202d or other components are performing operation that do not require as much energy. Other example energy sources for the robotic legs 202a-202d may exist as well.

In some example implementations, during operation, the controller may communicate with other systems of the robotic device 200 via wired or wireless connections and may further be configured to communicate with one or multiple users of the robotic device. As one possible illustration, the computing system may receive an input from a user indicating that the user wants the robotic device to perform a particular gait in a given direction. The computing system may process the input, and may cause the systems of the robotic device to perform the requested gait.

Furthermore, the robotic device 200 may communicate with one or multiple users and/or other robotic devices via various types of interfaces. In one example implementation, the robotic device 200 may receive input from a user via a joystick or similar type of interface. The computing system may be configured to measure the amount of force and other possible information from inputs received from a joystick interface. Similarly, the robotic device 200 may receive inputs and communicate with a user via other types of interfaces, such as a mobile device or a microphone.

Figure 3:
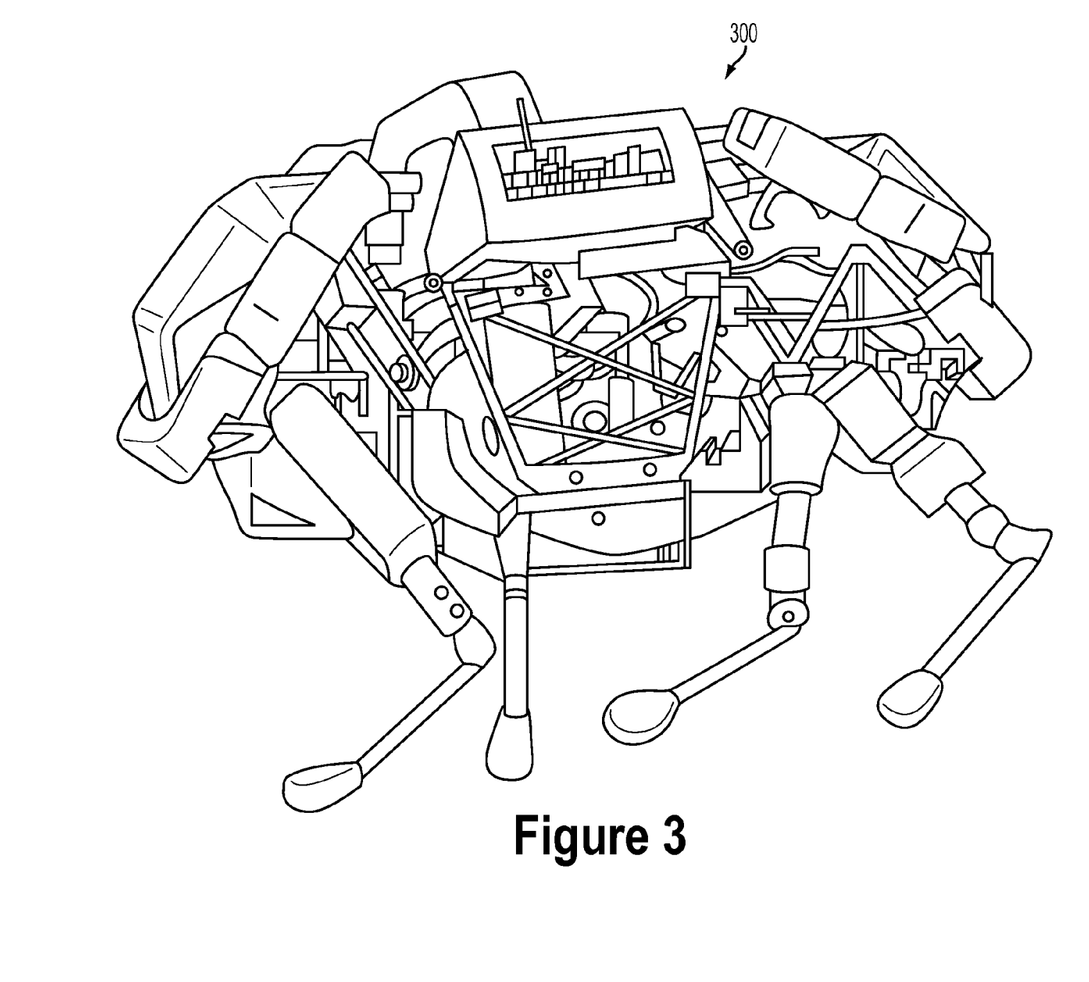
FIG. 3 illustrates another quadruped robot, according to an example implementation.

FIG. 3 illustrates another example quadruped robot, according to an example implementation. Similar to robotic device 200 shown in FIG. 2, the robotic device 300 may correspond to the robotic system 100 shown in FIG. 1. The robotic device 300 serves as another possible implementation of a robotic device that may be configured to perform bound and/or gallop gaits. Other example implementations of robotic devices may exist.

Figure 4:
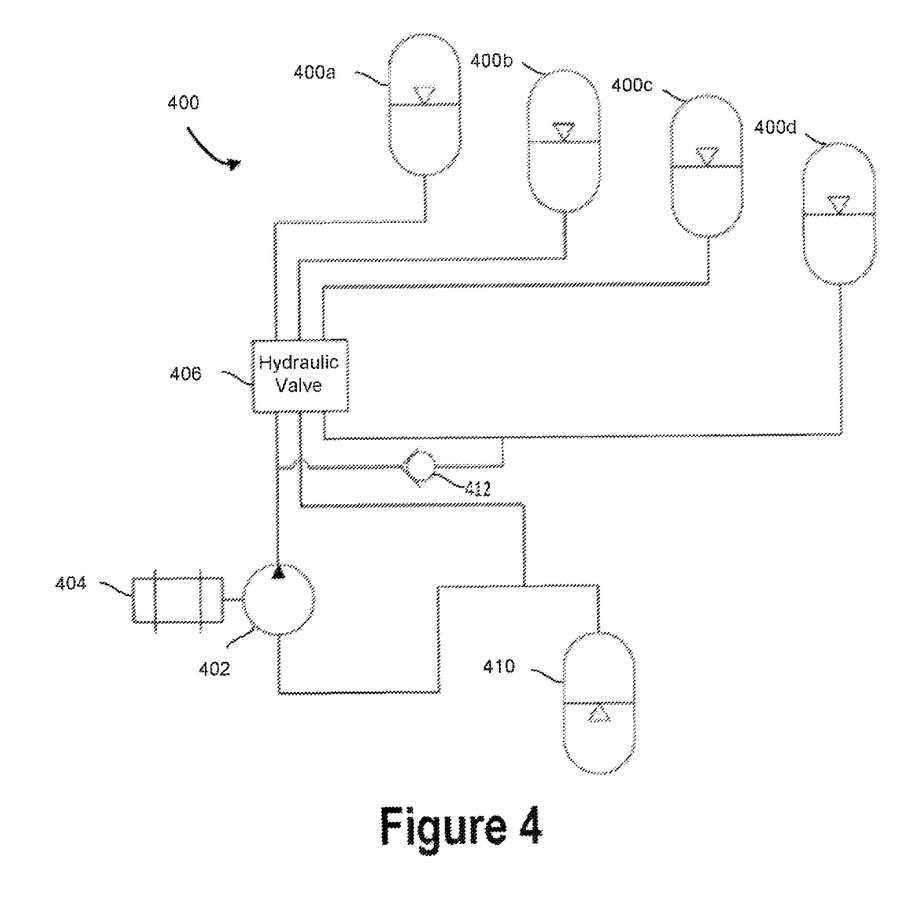
FIG. 4 illustrates a hydraulic system, according to an example implementation.

FIG. 4 illustrates an example hydraulic system of a robotic device. The hydraulic system 400 represents one example configuration that may power a robotic device, such as the robotic system 100 shown in FIG. 1. The hydraulic system 400 includes a pump 402, a motor 404, a hydraulic valve 406, hydraulic accumulator 408a, hydraulic accumulator 408b, hydraulic accumulator 408c, hydraulic accumulator 408d, a return hydraulic accumulator 410, and a check valve 412. In another example implementation, the hydraulic system 400 may include more or less components, which may depend on the design of the machine or device that the hydraulic system 400 powers. Additionally, the components of the hydraulic system 400 may be connected in other ways not illustrated herein.

As indicated, the hydraulic system 400 may generate, control, and/or transmit power through pressurize fluids, such as oil or water, to power various systems of the robotic device. During operation, the hydraulic system 400 may maintain a constant pressure to sustain the applied force, for example. This operation of the hydraulic system 400 may deviate from the operation of an electrical system that which may require a continuous voltage or current to maintain the same amount of force. Additionally, the hydraulic system 400 may enable high power density that uses smaller and/or lighter components than a comparative electrical system. Similarly, unlike an electrical system, the hydraulic system 400 might not rely upon a battery system that has a limited number of cycle times for use.

Within the hydraulic system 400, the pump 402 may pressurize incompressible fluid to supply power to the hydraulic accumulators 408a-408d through conducting materials, such as pipes, hoses, and tubes, etc. Example fluids may include oil and water, etc. The pump may connect to a reservoir or another type of source storing fluid for the hydraulic system 400 and may generate fluid flow at an increased pressure. In some example implementations, the pump 402 may be the only pump within the hydraulic system 400, which may reduce the weight of the hydraulic system 400. Additionally, using a single pump may reduce the cost associated with implementing the hydraulic system 400.

The pump 402 may be configured to operate in different pressure ranges. For example, the pump 402 may operate in a range between 3,000-5,000 pounds per square inch (psi) depending on the number of hydraulic accumulators within the hydraulic system. As such, the range of pressure may depend on the size and/or quantity of components in the hydraulic system 400. In some instances, the pump 402 operating as the only pump may be configured to operate near the full desired system flow to minimize quiescent losses of pumping to the return hydraulic accumulator 410.

Different types of pumps may be used within the hydraulic system 400. For example, the pump 402 may be a hydrostatic pump, hydrodynamic pump, or another type of pump. In other implementations, the pump 402 may exist as a fixed displacement axial piston pump. Additionally, the pump 402 may be an electric pump. The pump 402 may receive power from a battery source. Similarly, the pump 402 may be powered by a gasoline engine or other type of power source. Other types of pumps may be used.

Furthermore, in some example implementations, the hydraulic system 400 may include multiple pumps. The amount of pumps may depend on the design of the hydraulic system 400 and/or the machine (e.g., robotic device) being powered by the hydraulic system 400. In some multiple pump configurations, the hydraulic system 400 may include different types of pumps. Additionally, the speed of the pump 402 may be based on the target pressure levels of hydraulic accumulators and/or based on the measured pressure levels of the hydraulic accumulators.

The motor 404 may provide power to the pump 402 for pressurizing the fluid in the hydraulic system 400. Various types of motor(s) may be used to power the pump 402, such as electric motor(s) using electric power provided by a battery. In some instances, the motor 404 may be an adjustable speed motor and may operate at a speed that causes the fluid supply system to provide the fluid at a rate proportional to an estimate of a total fluid volume for operating the hydraulic accumulators at the respective target pressure levels. The motor 404 may operate at a velocity as controlled by the controller of the hydraulic system 400. Further, in some implementations, the motor 404 may be connected to the pump 402 to reduce energy losses. Removing distance between the pump 402 and the motor 404 may reduce leakage of power, for example.

Additionally, in another possible configuration, the pump 402 and/or motor 404 may include one or more flywheels configured to filter out motor acceleration that may result from pressure switching. The flywheel may be configured to function as a mechanical kinetic energy storage mechanism. In particular, the flywheel(s) may reduce peaking demands on a power source supplying power to the fluid supply system. Different types of flywheels may be used. For example, variable flywheels to flywheels configured to modify their inertia by adding and/or subtracting fluid. The energy capacity of a flywheel may depend upon the mass, speed, and/or geometry of the motor 404.

As shown in FIG. 4, the hydraulic system 400 may include a hydraulic valve 406 that switches the supply of fluid between the pump 402 and the hydraulic accumulators 408a-408d. In some example implementations, the hydraulic valve 406 may be positioned on the pump 402 to minimize compressibility losses.

A control system of the hydraulic system 400 may operate the hydraulic valve 406. For example, a controller may electrically switch the hydraulic valve 406. Other switching techniques may be used.

Furthermore, the hydraulic system 400 may include different types of hydraulic valves. In some instances, the hydraulic valve 406 may be a directional control valve, such as a check valve, directional spool valve, and/or a directional poppet valve. The hydraulic valve 406 may be a pressure control valve, which may be control tasked or switching tasked. Additionally, the hydraulic valve 406 may be a flow control valve or an electro-hydraulic valve. Other types and quantities of valves may be used within example hydraulic systems, such as auxiliary valves, cartridge valves, etc.

In one example implementation, the hydraulic valve 406 may be configured as a discrete directional-control valve and/or a digital valve within some examples. A digital valve may operate either on or off, which may involve the use of a plunger, poppet, or ball that seals against a seat and may provide a positive seal to prevent cross-port leakage.

In another implementation, the hydraulic valve 406 may be configured as a multi-selector valve enabling the selection of different tubes and/or pipes for enabling the flow of the pressurized fluid. Further, the hydraulic valve 406 may be configured as a proportional valve configured to control direction and speed of the fluid supply. The hydraulic valve 406 may be mechanically attached to the pump 402 to reduce pulsation. Further, the hydraulic valve 406 may be positioned nearby the pump 402, such as 10-20 centimeters away, for example. Other positions of the hydraulic valve 406 may exist. Other examples hydraulic valves may be configured to operate as fast acting on/off hydraulic valves that may enable quick switching of the fluid between hydraulic accumulators within the hydraulic system.

In some example implementations, the hydraulic system 400 may include multiple hydraulic valves, which may serve as a series of points that the control system may redirect the flow of fluid power from the pump(s) of the hydraulic system 400.

The hydraulic accumulators 408a-408d may be pressure storage reservoirs for holding the pressurized hydraulic fluid from the pump 402 and for supplying stored energy to power robotic components. During operation of the pump 402, a hydraulic accumulator of the hydraulic accumulators 408a-408d may charge when the hydraulic valve 406 is directing fluid pressure from the pump 402 towards them. As such, using a single pump 402 may cause a single hydraulic accumulator to charge at a time since the fluid supply pressure is coming from a single source.

The hydraulic accumulators 408a-408d may enable the hydraulic system 400 to power robotic components using a less powerful pump. The hydraulic accumulators 408a-408d may enable the hydraulic system 400 to respond quickly to power demands and may smooth out pulsations, for example. The hydraulic accumulators 408a-408d may receive pressurized fluid from the pump 402 and may include a non-return valve preventing flow back to the pump 402. The hydraulic accumulators 408a-408d may store energy from the pump 402 and provide the energy to components of the robotic device as controlled by load valves and/or the controller of the hydraulic system 400. The outflow of energy from a discharging hydraulic accumulator may be greater than even large pumps, for example. In some examples, one or more of the hydraulic accumulators 408a-408d may store up energy to provide a continuous flow of pressure for when the robotic components may need the power.

Additionally, the hydraulic accumulators 408a-408d may maintain the pressure for periods when there may be slight leaks without the pump being cycled on and off constantly. Further, the hydraulic accumulators 408a-408d may help absorb pressure excursions that may result from temperature changes.

The number of hydraulic accumulators may vary within example configurations of the hydraulic system 400. For example, a hydraulic system may include one or two hydraulic accumulators depending on the purpose of the system. Additionally, various types of hydraulic accumulators may be used by the hydraulic system 400, such as compressed gas accumulators (i.e., hydro-pneumatic accumulators), for example. The hydraulic accumulators 408a-408d may have adjustable target pressure and/or fluid levels, which may adjust based on the operation of the overall hydraulic system 400, for example.

The hydraulic accumulators 408a-408d may be configured as a "closed" design that involves liquid and gas chambers separated by a sliding piston. As such, the gas chamber may be pre-charged to a nominal pressure, after which energy may be stored by pumping pressurized fluid into the accumulator, thus reducing the volume of the stored gas. Energy may be extracted from a hydraulic accumulator when the gas forces the fluid back out the accumulator. By such, the hydraulic accumulators 408a-408d may supplement the hydraulic pump 402 by releasing energy when more power is required than the pump 402 can supply. The hydraulic accumulators 408a-408d may store the energy received from the pump 402 for powering components of the robotic device and restore energy after releasing the stored energy. As a result, less pump power may be required by the hydraulic system 400 to achieve the same transient peak performance with one or multiple hydraulic accumulators. This reduces operating costs, weight of the system, and improves the efficiency of the hydraulic system 400.

Using hydraulic accumulators 408a-408d may enable an example hydraulic system 400 to be downsized overall by reducing the number of pumps required. The hydraulic accumulators 408a-408d may improve the efficiency of the hydraulic system 400 and may provide stored energy to control accumulators, legs, and/or other components of an example robotic device.

In another example implementation, the hydraulic accumulators 408a-408d may store energy in an "open" approach, which may involve one or more of the hydraulic accumulators 408a-408d expelling and drawing compressed gas from the atmosphere. This way, the hydraulic accumulators 408a-408d may obtain additional energy from the same compressed gas since the gas is able to expand all the way down to atmospheric pressure.

The controller 108 may include a hydraulic accumulator management component that controls the fluid supplied to the hydraulic accumulators. One or multiple of the hydraulic accumulators 408a-408d may serve as a safety device if the pump 402 fails or if a leak forms within the hydraulic system 400 by providing power to components for a short period of time. Additionally, if there is a rapid temperature change, the hydraulic accumulators 408a-408d can provide a place for fluid to go in the case that the hydraulic system 400 does not include an expansion tank, which prevents lines from bursting under sudden pressure.

The return hydraulic accumulator 410 may serve to hold excess energy from the hydraulic system 400. In some configurations, the return hydraulic accumulator 410 may not be configured to supply power to robotic components, but may serve as a balance for the hydraulic system 400. The return hydraulic accumulator 410 may operate like hydraulic accumulators 408a-408d and may serve as the safety accumulator for receiving pressure in cases of malfunction within the hydraulic system 400. In some example configurations, the hydraulic system 400 may include multiple return hydraulic accumulators and/or other types of returns.

The check valve 412, also known as a clack valve, non-return valve, or a one-way valve, may be configured to permit fluids flow through one direction. The hydraulic system 400 may include one or more check valves positioned at different points. In some example configurations, the check valve 412 may include two openings in the body, with one opening for fluid to enter and the other opening for fluid to leave. Other types of check valves may be used.

Figure 5:
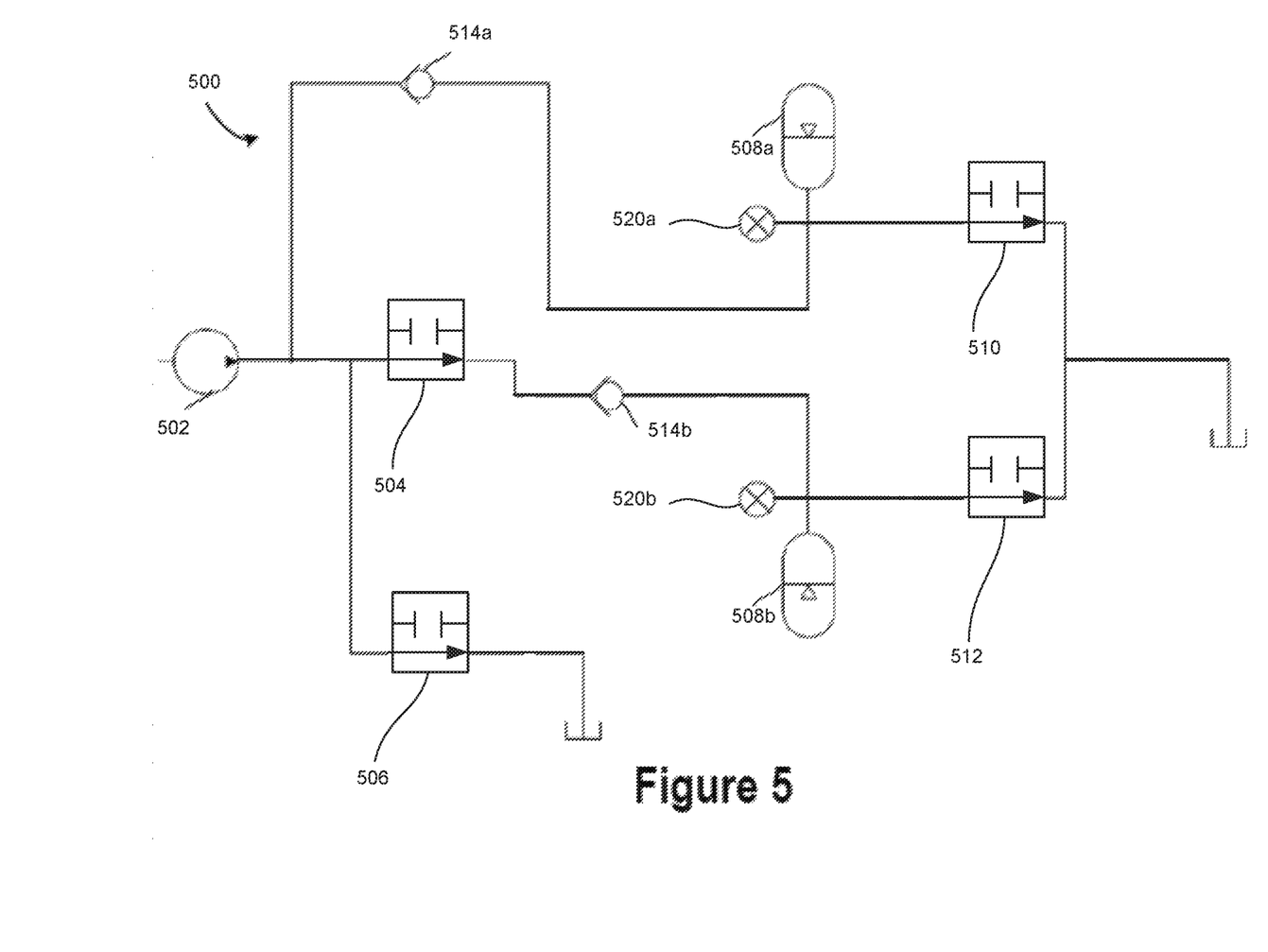
FIG. 5 illustrates another example hydraulic system, according to an example implementation.

FIG. 5 illustrates another example hydraulic system. Like the hydraulic system 400 shown in FIG. 4, the hydraulic system 500 may supply power to components of a robotic device or another type of machine. As shown in FIG. 5, the hydraulic system 500 includes a pump 502, a selector valve 504, a dump valve 506, hydraulic accumulators 508a-508b, a high pressure load valve 510, a middle pressure load valve 512, and check valves 514a-514b. Further, different designs of the hydraulic system 500 may include more or less components, such as additional pumps or hydraulic accumulators, etc.

Similar to the pump 402 in hydraulic system 400, the pump 502 may supply pressurized fluid throughout the hydraulic system 500 through a series of connections, such as tubes, hoses, and/or pipes. In example implementations, the pump 502 may be a fixed displacement axial piston pump powered by an electric motor to pressurize the fluid in the hydraulic system 500.

The hydraulic system 500 includes a selector valve 504 configured to direct pressurized flow from the pump 502. The selector valve 504 may be a middle pressure selector valve or may another type of hydraulic valve, such as the example hydraulic valves described in FIG. 4. As shown in FIG. 5, the selector valve 504 may control when the fluid pressure charges the middle pressure hydraulic accumulator 508b.

The dump valve 506 may control when the fluid supply may move to a return hydraulic accumulator and/or another type of return in the hydraulic system 500. In some instances, the control system may open the dump valve as a result of excessive pump flow to direct the fluid flow to the return (e.g., return hydraulic accumulator). The control system of the hydraulic system 500 may coordinate configurations of the selector valve 504 and the dump valve 506 to manipulate the path of the fluid pressure from the pump 502 within the hydraulic system 500. For example, the control system may close both the selector valve 504 and the dump valve 506 to cause the fluid power to charge the high pressure hydraulic accumulator 508a.

As shown, the hydraulic system 500 includes a high pressure hydraulic accumulator 508a and a middle pressure hydraulic accumulator 508b. In this configuration, the high pressure hydraulic accumulator 508a may have a high target pressure level and the middle pressure hydraulic accumulator 508b may have a middle pressure target pressure level. In an example, the hydraulic accumulator 508a may have a 5,000-6,000 psi target pressure range and the hydraulic accumulator 508b may have a 2,000-3,000 psi target pressure range.

In some other examples, the hydraulic accumulator 508a may have a target pressure level at 3,000 psi and the hydraulic accumulator 508b may have a target pressure level at 1,500 psi. Further, the hydraulic accumulators 508a-508b may have other target pressure levels and/or ranges. For example, the hydraulic accumulator 508a and the hydraulic accumulator 508b may have the same target pressure level or range. Similarly, the fluid levels of the hydraulic accumulators may vary within examples.

Additionally, in other example implementations, the hydraulic system 500 may include more hydraulic accumulators that operate at other target pressure levels. For example, the hydraulic system 500 may include ten hydraulic accumulators operating with each hydraulic accumulator operating at a different target pressure levels.

During operation, either the high pressure hydraulic accumulator 508a or the middle pressure hydraulic accumulator 508b may charge using pressurized fluid from the pump 502 based on the configuration of the selector valve 504 and the dump valve 506. In some example implementations, the hydraulic system 500 may include hydraulic accumulators that have different target pressure levels than the high pressure hydraulic accumulator 508a and the middle pressure hydraulic accumulator 508b shown in FIG. 5. Further, the hydraulic accumulators may also have adjustable target pressure levels in some examples.

In addition, the hydraulic system 500 may include a high pressure load valve 510 for controlling the release of power from the hydraulic accumulator 508a to one or more components of the mechanical device (e.g., robotic device). The control system may control operation of the high pressure load valve 510. Similarly, the hydraulic system 500 may also include a middle pressure load valve 512 for controlling the supply of power from the hydraulic accumulator 508b to component(s) of the mechanical device (e.g., robotic device).

Additionally, similar to hydraulic system 400, the hydraulic system 500 may include check valves 514a-514b configured to prevent backflow of fluid within the hydraulic system 500. As shown in FIG. 5, the check valve 514a may prevent backflow from the hydraulic accumulator 508a and the check valve 514b may prevent backflow from the hydraulic accumulator 508b. The hydraulic system 500 may include check valves positioned directly to selector manifold. Other examples may include more or less check valves having positions dependent on the design of the hydraulic system.

In an example implementation, the control system may operate the hydraulic valves within the hydraulic system 500 in multiple modes. For example, the control system may close the dump valve 506 and opening the selector valve 504 to cause fluid pressure to charge the medium pressure accumulator 508b. In another mode, the control system may close the dump valve 506 and close the selector valve 504 to direct the fluid pressure to charge the high pressure accumulator 508a. Other modes may exist based on the configuration of the selector valve 504 and the dump valve 506 in the hydraulic system 500.

Figure 6:
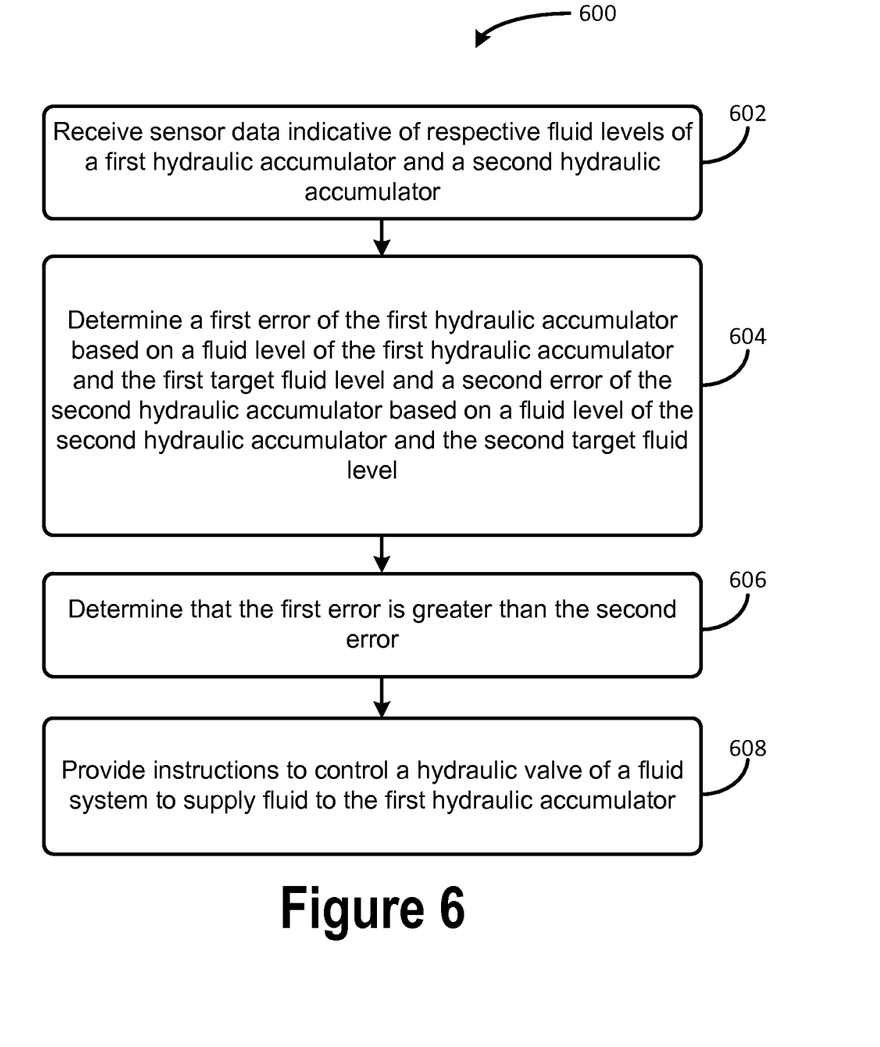
FIG. 6 is a flowchart for operating a robotic hydraulic system, according to an example implementation.

FIG. 6 is a flow chart of an example method for a robotic hydraulic system. The flow chart 600 may include one or more operations, or actions as illustrated by one or more blocks 602-608. Although the blocks are illustrated in a sequential order, these blocks may, in some instances, be performed in parallel, and/or in a different order than those described herein. Also, the various blocks may be combined into fewer blocks, divided into additional blocks, and/or removed based upon the desired implementation.

In addition, the flow chart shows functionality and operation of possible implementations of present implementations. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium, for example, such as computer-readable media that stores data for short periods of time like register memory, processor cache and Random Access Memory (RAM).

The computer readable medium may also include non-transitory media or memory, such as secondary or persistent long term storage, like read only memory (ROM), optical or magnetic disks, compact-disc read only memory (CD-ROM), for example. The computer readable media may also include any other volatile or non-volatile storage system. The computer readable medium may be considered a computer readable storage medium, a tangible storage device, or other article of manufacture, for example.

The non-transitory computer readable medium could also be distributed among multiple data storage elements, which could be remotely located from each other. A computing device or control system that executes some or all of the stored instructions could be any type of robotic device, such as the example robotic device 200 or the robotic device 300 illustrated in FIGS. 2 and 3, respectively. Alternatively, the computing device or system that executes some or all of the stored instructions could be another computing device or system, such as a server. In addition, each block in FIG. 6 may represent circuitry that is wired to perform the specific logical functions in the process.

At block 602, sensor data indicative of respective fluid levels of a first hydraulic accumulator and a second hydraulic accumulator may be received. As shown in FIG. 1, a robotic system may include a hydraulic system, such as hydraulic system 400 or hydraulic system 500, for providing power to components (e.g., legs). Other example configurations of hydraulics systems may be used.

As shown in FIGS. 4-5, a hydraulic system may include a single pump powered by a motor to supply pressurized fluid through tubes and/or pipes to components, such as one or multiple hydraulic accumulators. In some example configurations, the hydraulic system may include a first hydraulic accumulator and a second hydraulic accumulator for storing energy received from the pump. To switch the fluid supply between the first and second hydraulic accumulators, the hydraulic system may include a hydraulic valve controlled by a control system. Further, the hydraulic system may also include check valves, one or more flywheels, and/or other types of components.

A sensor system may monitor operation of the hydraulic system and provide the corresponding measurements to a control system (e.g., computing system, controller) configured to control the one or multiple valves of the hydraulic system. In some instances, the sensor system includes a plurality of sensors 520a-b each associated with a corresponding hydraulic accumulator and configured to measure a pressure level (e.g., pressure magnitudes) of the corresponding hydraulic accumulator. As such, the control system may receive sensor data indicative of a first pressure level of the first accumulator 508a from the sensor 520a and a second pressure level of the second accumulator 508b from the sensor 520b.

In example implementations, the control system may receive sensor data indicative of pressure levels of the hydraulic accumulators at predefined increments in time, such as every 50 milliseconds for example. The time range for the predefined increments may vary within examples or may depend upon the particular operations of the robotic device.

In other example implementations, the control system may continuously receive sensor data indicative of changes in the pressure levels of the hydraulic accumulators. As such, the control system may continuously monitor the pressure levels using the sensor data. Other examples of receiving sensor data corresponding to the hydraulic accumulators may exist.

In some implementations, the control system may receive information indicative of fluid levels of the hydraulic accumulators and/or other components of the hydraulic system. Sensor data may measure the levels of the hydraulic accumulators.

At block 604, a first error of the first hydraulic accumulator may be determined based on a fluid level of the first hydraulic accumulator and the first target fluid level. Also, a second error of the second hydraulic accumulator may be determined based on a fluid level of the second hydraulic accumulator and the second target fluid level. The fluid levels may correspond to volume levels and/or pressure levels, for example. Additionally, the errors may correspond to pressure errors, fluid volume errors, or other errors associated with the operation of the hydraulic accumulators. For example, the control system may use the measured pressure levels and the target pressure levels of to calculate the pressure errors for each hydraulic accumulator at a given time.

As shown in FIG. 4, a hydraulic accumulator may be configured to operate at a target pressure level. The first and second hydraulic accumulators within the hydraulic system may have the same and/or different target pressure levels. In an example configuration, the first hydraulic accumulator may operate at a high target pressure level and the second hydraulic accumulator may operate at a low target pressure level. The different target pressure levels may enable the first hydraulic accumulator and the second hydraulic accumulator to supply power to different components with varying power requirements. Additionally, the target pressure levels may be adjustable, which may be based on the operation of the robotic device, for example.

The control system and/or another computing device may use measured pressure levels and the target pressure levels of the hydraulic accumulators to calculate pressure errors for each hydraulic accumulator. A pressure error of a hydraulic accumulator may represent the difference between the actual pressure level and the target pressure level of the hydraulic accumulator. The control system may calculate a first pressure error of the first hydraulic accumulator and a second pressure error of the second hydraulic accumulator at a given time.

In other example implementations, the control system of a hydraulic system may calculate the pressure errors of hydraulic accumulators in a predefined order, which may involve determining the pressure errors of the hydraulic accumulators at different times. In such an example, the control system may be configured to calculate the respective error pressures of the hydraulic accumulators within a small time period, such as 10-20 milliseconds.

Furthermore, the control system may determine other errors, such as fluid volume errors of the hydraulic accumulators. The control system may determine the fluid volume errors based on the volumes of the hydraulic accumulators, the target volumes of the hydraulic accumulators, the pressure levels, and/or other operation of the hydraulic system, for example.

At block 606, it may be determined that the first error is greater than the second error. For example, the control system of the hydraulic system may compare the calculated first pressure error of the first hydraulic accumulator to the second pressure error of the second hydraulic accumulator to determine which hydraulic accumulator has the greatest pressure error at the time of measurements. As a result, the control system may determine that the first pressure error of the first hydraulic accumulator is greater than the second pressure error.

In some instances, the control system may determine that the second pressure error of the second hydraulic accumulator is greater than the first pressure error of the first hydraulic accumulator.

As the robotic device operates using the stored energy within the hydraulic accumulators to power the legs of the robotic device and/or other components, the pressure levels within the hydraulic accumulators may change. As a result, the control system may determine that the hydraulic accumulator with the greatest pressure error may differ as the robotic operates.

In some example configurations, the control system may compare the pressure errors of three or more hydraulic accumulators. Similar to a hydraulic system with two hydraulic accumulators, the control system may determine the hydraulic accumulator with the greatest pressure error.

In other examples, the control system may determine a first fluid volume error of the first hydraulic accumulator is greater than a second fluid volume error of a second hydraulic accumulator. The control system may determine the hydraulic accumulator with the greatest fluid volume error in a hydraulic system having multiple hydraulic accumulators, for example.

At block 608, instructions may be provided to control a hydraulic valve of a fluid supply system to supply fluid to the first hydraulic accumulator. The control system may provide instructions to systems to cause the flow of fluid to supply the first hydraulic accumulator since the calculated pressure error of the first hydraulic accumulator is greater than the pressure error of the second hydraulic accumulator. The instructions may involve the control system and/or another system controlling a hydraulic valve of the hydraulic system to cause the direction of the fluid to enter into the first hydraulic accumulator.

The control system may configure the hydraulic valve to direct the fluid power into the hydraulic accumulator with the greatest calculated pressure error. In some instances, the control system may direct the fluid into another hydraulic accumulator despite another hydraulic accumulator having the greatest calculated pressure error. For example, in a system with many hydraulic accumulators, the control system may control the hydraulic valve to send fluid from the single pump to any hydraulic accumulator with a pressure error exceeding a predefined threshold.

By switching the flow of the fluid, the hydraulic system may continue to operate efficiently with the hydraulic accumulators receiving fluid power to maintain storage levels near target pressure levels for supply power to components of the robotic device. The control system may electrically and/or mechanically control the hydraulic valve to switch the flow of the fluid, which may depend upon the design of the hydraulic valve.

The control system may cause the fluid system to provide pressurized fluid to the hydraulic accumulator with a high or highest fluid volume error in some instances. The control system may control the hydraulic valve based on other errors of the hydraulic accumulators determined by the control system. The different errors may cause the control system to control the hydraulic valve differently.

In some instances, the hydraulic accumulator with the largest pressure error may not be the hydraulic accumulator that requires fluids the soonest. For example, a high pressure accumulator may tend to have numerically higher pressure errors, even if the high pressure accumulator needs a relatively small amount of fluid added or removed. As such, the system may operate based on changes in the gas pressure or gas volume within the hydraulic accumulators in some implementations. The gas pressure and gas volume in the hydraulic accumulators are related to each other by the Ideal Gas Law. As such, the addition of fluid into the accumulator may displace air. For example, the pressure within the hydraulic accumulator may correspond via a nonlinear function of the fluid volume.

In example implementations, the control system may control the hydraulic valve at predefined time increments, which may cause the hydraulic system to switch the flow of the fluid in a structured schedule. For example, the control system may switch the state of the hydraulic valve every 50 milliseconds or every 100 milliseconds. Similarly, the control system may switch the state of the hydraulic valve every 10 milliseconds or every 20 milliseconds, for example. Likewise, other time ranges may be used for determining when to switch the hydraulic valve.

In other examples, the control system may operate asynchronously, which may involve checking the errors of the hydraulic accumulators at a high rate, but switching the hydraulic valve after a certain amount of time passes since the last switch of the hydraulic valve. The control system may operate hydraulic valve(s) based on disturbances within the hydraulic system while keeping the frequency of switching the hydraulic valve(s) low. The control system may control the hydraulic valve(s) at different rates based on determined errors of the hydraulic accumulators, for example.

In another example implementation, the control system may control the hydraulic valve based on a predefined frequency for changing the direction of supplying the fluid to the hydraulic accumulators. Other examples may exist as well.

The arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. The terminology used herein is for the purpose of describing particular implementations only, and is not intended to be limiting.

What is claimed is:

1. A hydraulic system comprising:
   a plurality of hydraulic accumulators configured to operate at corresponding target fluid levels;
   a plurality of sensors, each sensor associated with a corresponding hydraulic accumulator and configured to measure a fluid level of the corresponding hydraulic accumulator;
   a pump;
   a hydraulic valve coupled to the pump and configured to receive pressurized fluid from the pump and direct the pressurized fluid to the hydraulic accumulators; and
   a controller configured to:
      for each hydraulic accumulator, calculate a corresponding error based on the corresponding fluid level and the corresponding target fluid level;
      determine the hydraulic accumulator having the greatest corresponding error among the plurality of hydraulic accumulators; and
      electronically control the hydraulic valve to direct the pressurized fluid from the pump to the hydraulic accumulator having the greatest corresponding error.

2. The hydraulic system of claim 1, wherein the target fluid levels are target fluid pressure levels, and wherein the fluid levels of the hydraulic accumulators are fluid pressure levels of the hydraulic accumulators.

3. The hydraulic system of claim 1, wherein the target fluid levels are target fluid volume levels, and wherein the fluid levels of the hydraulic accumulators are fluid volume levels of the hydraulic accumulators.

4. The hydraulic system of claim 1, wherein the hydraulic valve is mechanically attached to the pump.

5. The hydraulic system of claim 1, wherein the controller is configured to control the hydraulic valve to direct the pressurized fluid to different hydraulic accumulators of the hydraulic accumulators at predefined time increments.

6. The hydraulic system of claim 5, wherein the predefined time increments are within a range of 50 milliseconds to 150 milliseconds.

7. The hydraulic system of claim 1, wherein the controller is configured to determine the hydraulic accumulator having the greatest corresponding error among the plurality of hydraulic accumulators at a predefined frequency.

8. The hydraulic system of claim 1, further comprising one or more check valves coupled to the hydraulic valve, wherein the one or more check valves are configured to prevent backflow of the fluid directed by the hydraulic valve.

9. The hydraulic system of claim 1, wherein the respective errors of the hydraulic accumulators correspond to respective fluid volume errors of the hydraulic accumulators.

* * * * *